(12) United States Patent
Pandey et al.

(10) Patent No.: US 12,534,129 B2
(45) Date of Patent: *Jan. 27, 2026

(54) SYSTEMS AND METHODS FOR TRAILER ANGLE DETECTION

(71) Applicant: Ford Global Technologies, LLC, Dearborn, MI (US)

(72) Inventors: Gaurav Pandey, College Station, TX (US); Nikita Jaipuria, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/813,145

(22) Filed: Aug. 23, 2024

(65) Prior Publication Data
US 2024/0409158 A1 Dec. 12, 2024

Related U.S. Application Data

(63) Continuation of application No. 17/578,635, filed on Jan. 19, 2022, now Pat. No. 12,097,899.

(51) Int. Cl.
B62D 13/06 (2006.01)
B60R 1/00 (2022.01)
B60R 1/26 (2022.01)
B60R 11/04 (2006.01)
B60W 40/105 (2012.01)
B62D 15/02 (2006.01)
G06N 3/02 (2006.01)
G06V 10/82 (2022.01)
G06V 20/56 (2022.01)

(52) U.S. Cl.
CPC .............. *B62D 13/06* (2013.01); *B60R 1/003* (2013.01); *B60R 1/26* (2022.01); *B60R 11/04* (2013.01); *B60W 40/105* (2013.01); *B62D 15/021* (2013.01); *G06N 3/02* (2013.01); *G06V 10/82* (2022.01); *G06V 20/56* (2022.01); *B60R 2300/808* (2013.01); *B60W 2540/18* (2013.01); *G06T 2207/20084* (2013.01)

(58) Field of Classification Search
None
See application file for complete search history.

(56) References Cited

U.S. PATENT DOCUMENTS

| | | |
|---|---|---|
| 9,616,923 B2 | 4/2017 | Lavoie et al. |
| 10,532,698 B2 | 1/2020 | Potnis et al. |
| 10,829,046 B2 | 11/2020 | Nagasamy |
| 11,077,795 B2 | 8/2021 | Jales Costa et al. |
| 2014/0379217 A1 | 12/2014 | Rupp et al. |
| 2019/0016264 A1 | 1/2019 | Potnis et al. |
| 2021/0064046 A1 | 3/2021 | Singh |
| 2022/0291377 A1 | 9/2022 | Medinei et al. |

Primary Examiner — Rebecca A Volentine
(74) Attorney, Agent, or Firm — Lorne Forsythe; Price Heneveld LLP

(57) ABSTRACT

A trailer angle identification system includes an imaging device configured to capture an image. A controller is configured to receive steering angle data corresponding to a steering angle of a vehicle, receive vehicle speed data corresponding to a vehicle speed, and estimate an angle of the trailer relative to the vehicle by processing the image, the steering angle data, and the vehicle speed data in at least one neural network.

20 Claims, 11 Drawing Sheets

SYSTEMS AND METHODS FOR TRAILER ANGLE DETECTION

CROSS-REFERENCE TO RELATED APPLICATION

This application is a continuation of U.S. patent application Ser. No. 17/578,635 filed on Jan. 19, 2022, now U.S. Pat. No. 12,097,899, entitled "SYSTEMS AND METHODS FOR TRAILER ANGLE DETECTION." The aforementioned related application is hereby incorporated by reference.

FIELD OF THE DISCLOSURE

The present disclosure generally relates to trailer backup assist systems, and, more particularly, to trailer backup assist systems employing trailer angle detection through image processing.

BACKGROUND OF THE DISCLOSURE

Reversing a vehicle while towing a trailer can be challenging for many drivers, particularly for drivers that drive with a trailer on an infrequent basis or with various types of trailers. Some systems used to assist a driver in backing a trailer rely on trailer angle measurements to determine the position of the trailer relative to the vehicle. Thus, the accuracy and reliability of the trailer angle measurements can be critical to the operation of the trailer backup assist system.

SUMMARY OF THE DISCLOSURE

According to a first aspect of the present disclosure, a trailer angle identification system comprises an imaging device configured to capture at least one image of a trailer. A controller is configured to receive steering angle data corresponding to a steering angle of a vehicle, receive vehicle speed data corresponding to a vehicle speed, and estimate an angle of the trailer relative to the vehicle by processing the at least one image, the steering angle data, and the vehicle speed data in at least one neural network.

Embodiments of the first aspect of the present disclosure can include any one or a combination of the following features:

- the at least one neural network comprising a first neural network and a second neural network, the first neural network operable to process the at least one image and the second neural network operable to process the steering angle data and the vehicle speed data;
- an output of the second neural network is an estimated range of a change of the angle;
- the at least one neural network comprising a third neural network operable to process a first output of the first neural network and a second output of the second neural network;
- the third neural network is a fully-connected neural network;
- the controller is further configured to train the third neural network to estimate the angle based on a difference between the first output and the second output;
- the third neural network is further trained to limit the angle by comparing the angle to the first output and the second output; and
- the controller is further configured to compare the angle to a previous estimation of the angle estimated by the at least one network.

According to a second aspect of the present disclosure, a method of identifying a trailer angle comprises capturing at least one image of a trailer in a field of view, receiving steering angle data corresponding to a steering angle of a vehicle, receiving vehicle speed data corresponding to a vehicle speed, and estimating an angle of the trailer relative to the vehicle by processing the image, the steering angle data, and the vehicle speed data in at least one neural network.

Embodiments of the second aspect of the present disclosure can include any one or a combination of the following features:

- the at least one neural network comprises a first neural network and a second neural network, the first neural network operable to process the image and the second neural network operable to process the steering angle data and the vehicle speed data;
- an output of the second neural network is an estimated range of a change of the angle;
- the at least one neural network comprises a third neural network operable to process a first output of the first neural network and a second output of the second neural network;
- the third neural network is a fully-connected neural network;
- training, via a controller, the third neural network to estimate the angle based on a difference between the first output and the second output;
- the third neural network is further trained to limit the angle by comparing the angle to the first output and the second output;
- comparing the angle to a previous estimation of the angle estimated by the at least one network; and
- limiting the angle based on the comparison of the angle to the previous estimation of the angle.

According to a third another aspect of the present disclosure, a trailer angle identification system comprises an imaging device configured to capture an image, an angle sensor configured to measure a steering angle of a vehicle, a speed sensor configured to measure a vehicle speed, and a controller configured to process the image in a first neural network trained to estimate a first angle of the trailer relative to the vehicle, process the steering angle and the vehicle speed in a second neural network trained to determine an estimated change in the trailer angle, estimate the trailer angle based on the first angle and the estimated change, and update the trailer angle by comparing the estimated change to a difference of the trailer angle and a previous estimation of the trailer angle.

Embodiments of the third aspect of the present disclosure can include any one or a combination of the following features:

- the estimated change in the trailer angle includes a range having a minimum angle change and a maximum angle change.

These and other features, advantages, and objects of the present disclosure will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the present disclosure is not limited to such embodiments, and additional modifications, applications, and embodiments may be implemented without departing from the present disclosure. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
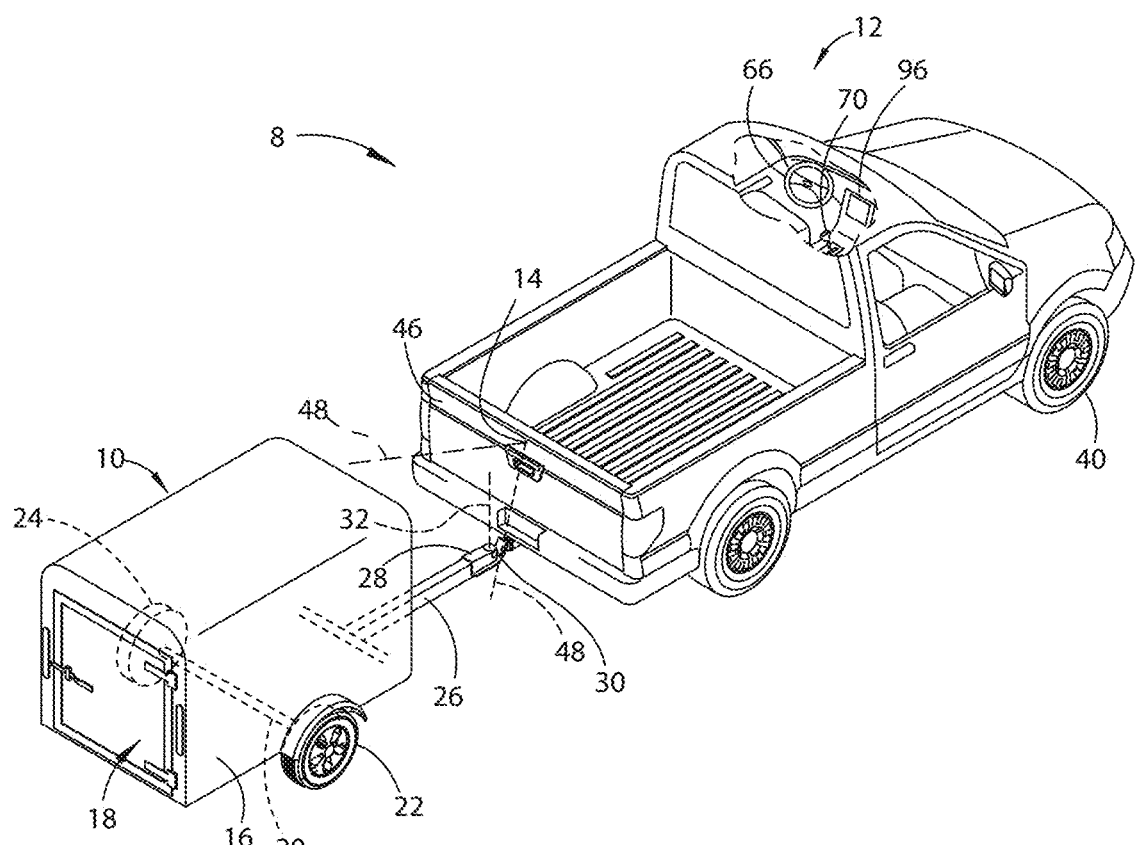
FIG. 1 is a top perspective view of a vehicle attached to a trailer with one embodiment of a trailer angle sensor for operating a trailer backup assist system according to one aspect of the disclosure.
Figure 2:
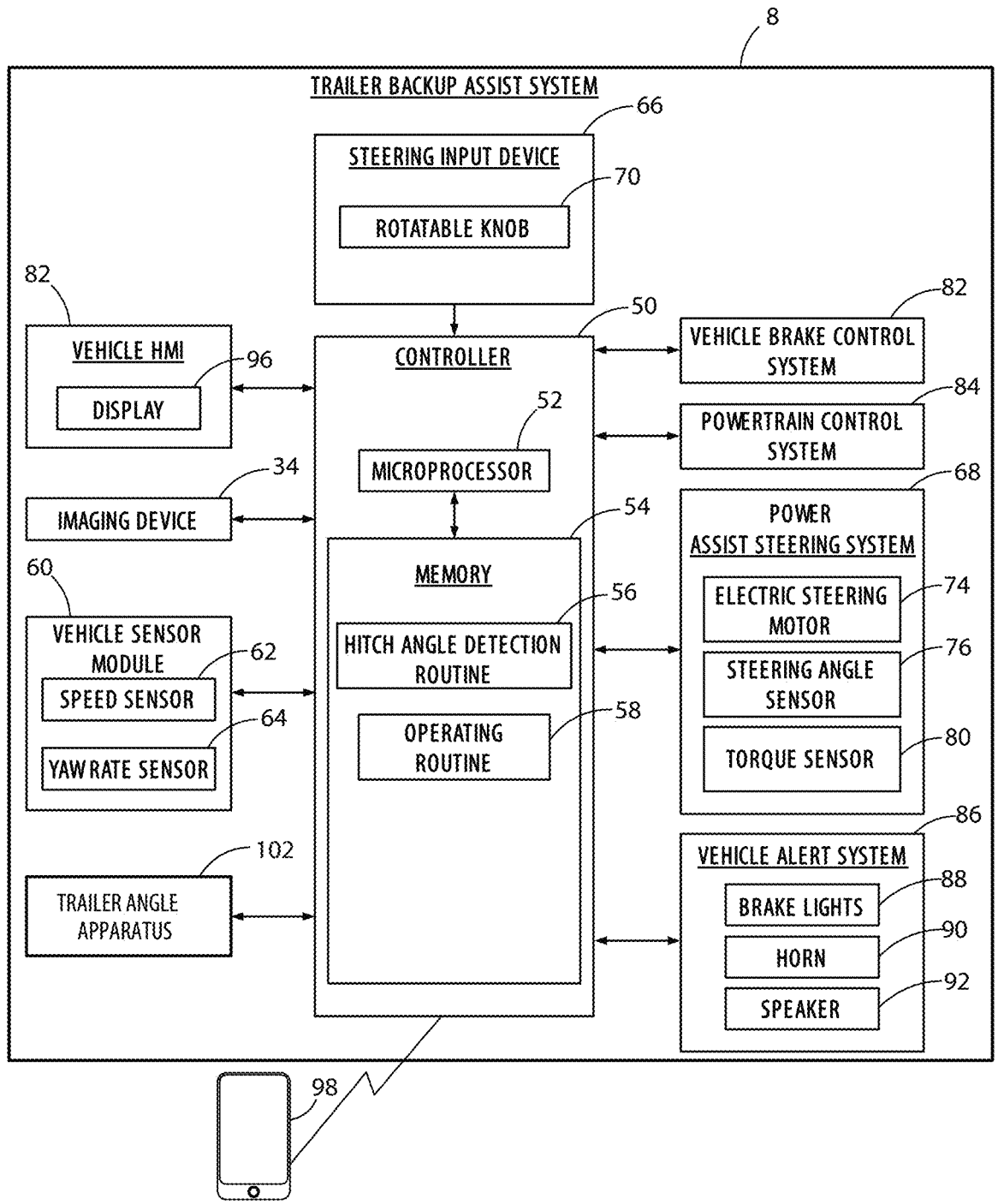
FIG. 2 is a block diagram illustrating one embodiment of the trailer backup assist system.
Figure 3:
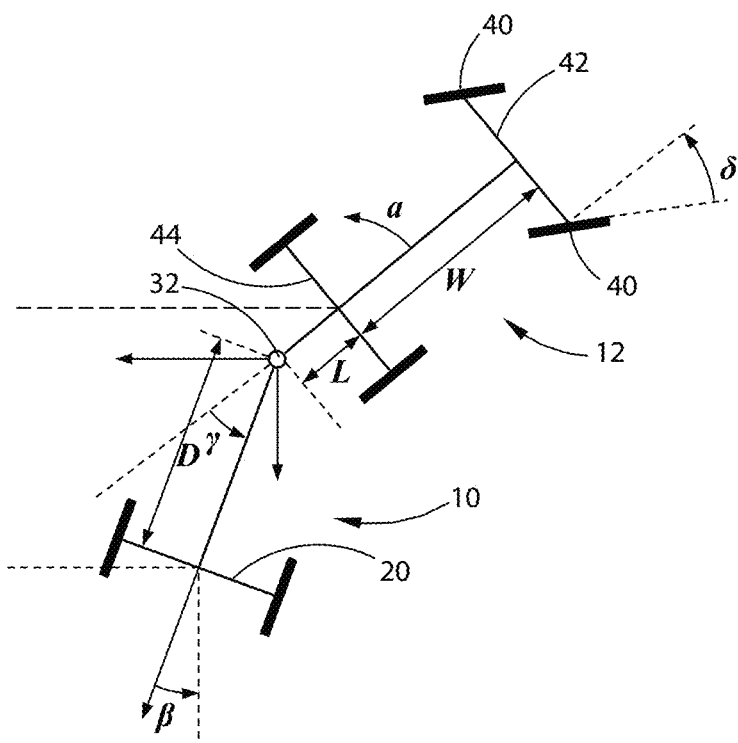
FIG. 3 is a kinematic model of the vehicle and trailer shown in FIG. 1 according to one aspect of the disclosure.

Referring to FIGS. 1, 2, and 3, reference numeral 8 generally designates a trailer backup assist system for controlling a backing path of a trailer 10 attached to a vehicle 12. The system 8 may allow a driver of the vehicle 12 to specify a desired curvature of the backing path of the trailer 10. In order to achieve such operation, a trailer angle $\gamma$ (shown in FIG. 3) between the vehicle 12 and the trailer 10 may be monitored to provide feedback to the system 8 throughout operation. However, accurately detecting the trailer angle $\gamma$ may be challenging when considering the wide variations in trailer hitch types, weather-related visibility conditions, lighting conditions, trailer angle ranges, driving surface irregularity, road markers (e.g., parking lines, lane lines, etc.) and various additional variables that may cause variations in measurement. In order to improve the reliability of identifying the trailer angle $\gamma$, the disclosure provides for an improved system and method for end-to-end learning to identify a trailer angle $\gamma$.

In particular, the disclosure provides for the detection of the trailer angle $\gamma$ based on the image data captured by an imaging device 14 and sensor data corresponding to a steering angle $\delta$ of vehicle and vehicle speed v. Based on the image data captured by the imaging device 14, the system 8 may identify various characteristics of the trailer 10 based on a variety of image processing techniques (e.g. edge detection, background subtraction, template matching, etc.). However, due to variations related in the trailer 10 and the local environment (e.g. shadows, textured surfaces, noise, parking lines, etc.), some image processing techniques may not be sufficiently robust to reliably and accurately monitor the trailer angle $\gamma$ without the aid of add-on sensor modules that are configured to measure various aspects related to the trailer angle $\gamma$.

As discussed herein, the improved systems and methods may utilize neural networks to improve the reliability and accuracy of the identified trailer angle $\gamma$ to improve operation of the system 8. The neural networks and related methods may be configured to learn how to accurately detect the trailer angle $\gamma$ without human intervention such that the resulting neural network may accurately identify the trailer angle based solely on image data acquired from the imaging device 14 and sensor data acquired from sensing devices already provided in a vehicle, such as a steering angle sensor and a vehicle speed sensor. Accordingly, the methods and systems discussed herein, may detect the trailer angle $\gamma$ based solely on the image data acquired from the imaging device 14 and sensor data from sensors already included in the vehicle, without the need for patterned markers, visual cues, or other aids that may otherwise be required to enable accurate operation of the system 8.

As further discussed in reference to FIGS. 3-6, the disclosure provides a solution for the detection of the trailer angle $\gamma$ based on deep learning and convolutional networks. In this way, the system 8 may reliably estimate the trailer angle $\gamma$ based on an end-to-end approach for angle estimation utilizing only the existing backup camera (e.g. imaging device 14 of the vehicle 12) and sensors typically included in a vehicle (e.g., advanced driver-assistance system (ADAS) sensors). As discussed herein, the deep neural networks provided for the detection of the trailer angle γ may contain thousands or millions of tunable parameters. Based on these parameters, the system 8 may accurately represent highly non-linear models while being very robust to noise. In some embodiments, convolutional layers may be trained to detect diverse features, similarly to human perception as such networks are capable of generalizing scenarios for later detection.

Referring still to FIGS. 1, 2, and 3, the vehicle 12 is embodied as a pickup truck that is pivotally attached to one embodiment of the trailer 10. The trailer 10 may comprise a box frame 16 with an enclosed cargo area 18. An axle 20 of the trailer may be operably coupled to wheels 22 and 24, and a tongue 26 may extend longitudinally forward from the enclosed cargo area 18. The illustrated trailer 10 comprises a trailer hitch connector in the form of a coupler assembly 28. The coupler assembly 28 is connected to a vehicle 12 via a hitch ball 30, which may be connected to the vehicle 12 by a drawbar. In operation, the coupler assembly 28 may latch onto the hitch ball 30 to provide a pivoting hitch point 32 that allows for articulation of the trailer angle γ between the vehicle 12 and the trailer 10.

As shown in FIG. 3, the trailer angle γ is shown in relation to a number of parameters of the vehicle 12 and the trailer 10. In operation, the kinematic model depicted in FIG. 3 may be utilized as the basis for the system 8 to control the navigation of the vehicle 12 to direct the trailer 10 along a calculated path. During such operations, the system 8 may monitor the trailer angle γ to ensure that the trailer 10 is accurately guided by the vehicle 12. The parameters that may be utilized for the model include, but are not limited to, the following:

- δ: steering angle at steered wheels 40 of the vehicle 12;
- ν: speed of the vehicle (vehicle speed);
- α: yaw angle of the vehicle 12;
- β: yaw angle of the trailer 10;
- γ: trailer angle between the vehicle 12 and the trailer 10 (γ=β−α);
- W: wheelbase length between a front axle 42 and a rear axle 44 of the vehicle 12;
- L: drawbar length between the hitch point 32 and the rear axle 44 of the vehicle 12; and
- D: trailer length between the hitch point 32 and axle 20 of the trailer 10 or effective axle for multiple axle trailers.

It should be appreciated that additional embodiments of the trailer 10 may alternatively couple with the vehicle 12 to provide a pivoting connection, such as by connecting with a fifth wheel connector. It is also contemplated that additional embodiments of the trailer 10 may include more than one axle and may have various shapes and sizes configured for different loads and items, such as a boat trailer or a flatbed trailer.

In some embodiments, the trailer backup assist system 8 may also include the imaging device 14 located at the rear of the vehicle 12 and configured to image a rear-vehicle scene. The imaging device 14 may be centrally located at an upper region of a vehicle tailgate 46 such that the imaging device 14 is elevated relative to the tongue 26 of the trailer 10. The imaging device 14 has a field of view 48 located and oriented to capture one or more images that may include the tongue 26 of the trailer 10 and the hitch ball 30, among other things. Captured images or image data may be supplied to a controller 50 of the trailer backup assist system 8. As discussed herein, the image data may be processed by the controller 50 to determine the trailer angle γ between the vehicle 12 and the trailer 10.

Referring now to FIG. 2, the controller 50 may comprise a microprocessor 52 and/or other analog and/or digital circuitry for processing one or more logic routines stored in a memory 54. The logic routines may include one or more trailer angle detection routines 56, which may comprise one or more deep learning neural networks as well as operating routines 58, which may be configured to guide the vehicle 12. Information from the imaging device 14 or other components of the trailer backup assist system 8 may be supplied to the controller 50 via a communication network of the vehicle 12, which can include a controller area network (CAN), a local interconnect network (LIN), or other conventional protocols used in the automotive industry. It should be appreciated that the controller 50 may be a stand-alone dedicated controller or may be a shared controller integrated with the imaging device 14 or other component of the trailer backup assist system 8 in addition to any other conceivable onboard or off-board vehicle control systems.

In an exemplary embodiment, the controller 50 of the trailer backup assist system 8 may be configured to communicate with a variety of vehicle equipment. The trailer backup assist system 8 may include a vehicle sensor module 60 that monitors certain dynamics of the vehicle 12. The vehicle sensor module 60 may generate a plurality of signals that are communicated to the controller 50 and may include a vehicle speed signal generated by a speed sensor 62 and a vehicle yaw rate signal generated by a yaw rate sensor 64. A steering input device 66 may be provided to enable a driver to control or otherwise modify the desired curvature of the backing path of the trailer 10.

The steering input device 66 may be communicatively coupled to the controller 50 in a wired or wireless manner. In this configuration, steering input device 66 may provide the controller 50 with information defining the desired curvature of the backing path of the trailer 10. In response, the controller 50 may process the information and generate corresponding steering commands that are supplied to a power assist steering system 68 of the vehicle 12. In some embodiments, the steering input device 66 may comprise a rotatable knob 70 operable to rotate to positions that may correspond to an incremental change to the desired curvature of a backing path of the trailer 10.

According to some embodiments, the controller 50 of the trailer backup assist system 8 may control the power assist steering system 68 of the vehicle 12 to operate the steered wheels 40 to direct the vehicle 12 in such a manner that the trailer 10 reacts in accordance with the desired curvature of the backing path of the trailer 10. The power assist steering system 68 may be an electric power-assisted steering (EPAS) system that includes an electric steering motor 74 for turning the steered wheels 40 to a steering angle δ based on a steering command generated by the controller 50. In this configuration, the steering angle δ may be sensed by a steering angle sensor 76 of the power assist steering system 68 and provided to the controller 50. The steering angle sensor 76 may be coupled to a steering column of the vehicle 12 and/or any other portion of a steering system of the vehicle, such as the steering input device 66, a steering shaft interacting with the steering column, the steered wheels 40, tie rods connected to the steered wheels 40, etc. The steering command may be provided for autonomously steering the vehicle 12 during a backup maneuver and may alternatively be provided manually via a rotational position (e.g., a rotational position of the steering input device 66 or the rotatable knob 70.

In some embodiments, the steering input device 66 (e.g., steering wheel) of the vehicle 12 may be mechanically coupled with the steered wheels 40 of the vehicle 12, such that the steering input device 66 may move in concert with steered wheels 40 via an internal torque, thereby preventing manual intervention with the steering input device 66 during autonomous steering of the vehicle 12. In such instances, the power assist steering system 68 may include a torque sensor 80 that senses torque (e.g., gripping and/or turning) on the steering input device 66, which may not be expected from autonomous control of the steering input device 66. Such unexpected torque may be detected by the controller 50 to indicate manual intervention by the driver. In some embodiments, external torque applied to the steering input device 66 may serve as a signal to the controller 50 that the driver has taken manual control and for the trailer backup assist system 8 to discontinue autonomous steering functionality.

The controller 50 of the trailer backup assist system 8 may also communicate with a vehicle brake control system 82 of the vehicle 12 to receive vehicle speed information, such as individual wheel speeds of the vehicle 12. Additionally or alternatively, vehicle speed information may be provided to the controller 50 by a powertrain control system 84 and/or the speed sensor 62, among other conceivable means. The vehicle speed information may include velocity information, such as a vehicle speed v reflecting the speed of the vehicle 12 and directional information indicating the direction of the vehicle speed v. The speed sensor 62 may be coupled to any portion of the vehicle that may be capable of detecting a speed of the vehicle 12, such as a gas pedal assembly, a brake pedal assembly, a fuel injection system, a gyroscope, the powertrain control system 84, and the like. It is conceivable that individual wheel speeds may be used to determine a vehicle yaw rate, which can be provided to the controller 50, in the alternative or in addition, to the vehicle yaw rate measured by the yaw rate sensor 64 of the vehicle sensor module 60. In some embodiments, the controller 50 may provide braking commands to the vehicle brake control system 82, thereby allowing the trailer backup assist system 8 to manage the speed of the vehicle 12 during a backup maneuver of the trailer 10. It should be appreciated that the controller 50 may additionally or alternatively manage the speed of the vehicle 12 via interaction with the powertrain control system 84.

Through interaction with the power assist steering system 68, the vehicle brake control system 82, and/or the powertrain control system 84 of the vehicle 12, the potential for unacceptable trailer backup conditions can be reduced. Examples of unacceptable trailer backup conditions include, but are not limited to, a vehicle over-speed condition, a high trailer angle rate, trailer angle dynamic instability, a trailer jackknife condition, sensor issues, and the like. In such circumstances, the driver may be unaware of the issue until the unacceptable trailer backup condition is imminent or already happening. In order to avoid such conditions, the controller 50 may be configured to accurately monitor the trailer angle γ thereby providing feedback to ensure accurate operation.

According to some embodiments, the controller 50 may communicate with one or more devices, including a vehicle alert system 86, which may prompt visual, auditory, and tactile alerts. For instance, vehicle brake lights 88 and vehicle emergency flashers may provide a visual alert and a vehicle horn 90 and/or speaker 92 may provide an audible alert. Additionally, the controller 50 and/or vehicle alert system 86 may communicate with a human machine interface (HMI) 82 of the vehicle 12. The HMI 82 may include a touchscreen vehicle display 96, such as a center-stack mounted navigation or entertainment display capable of displaying images indicating the alert. Such an embodiment may be desirable to notify the driver of the vehicle 12 that an unacceptable trailer backup condition is occurring. Further, it is contemplated that the controller 50 may communicate via wireless communication with one or more electronic portable devices, such as portable electronic device 98, which is shown embodied as a smartphone. The portable electronic device 98 may include a display for displaying one or more images and other information to a user. In response, the portable electronic device 98 may provide feedback information, such as visual, audible, and tactile alerts.

Figure 4:
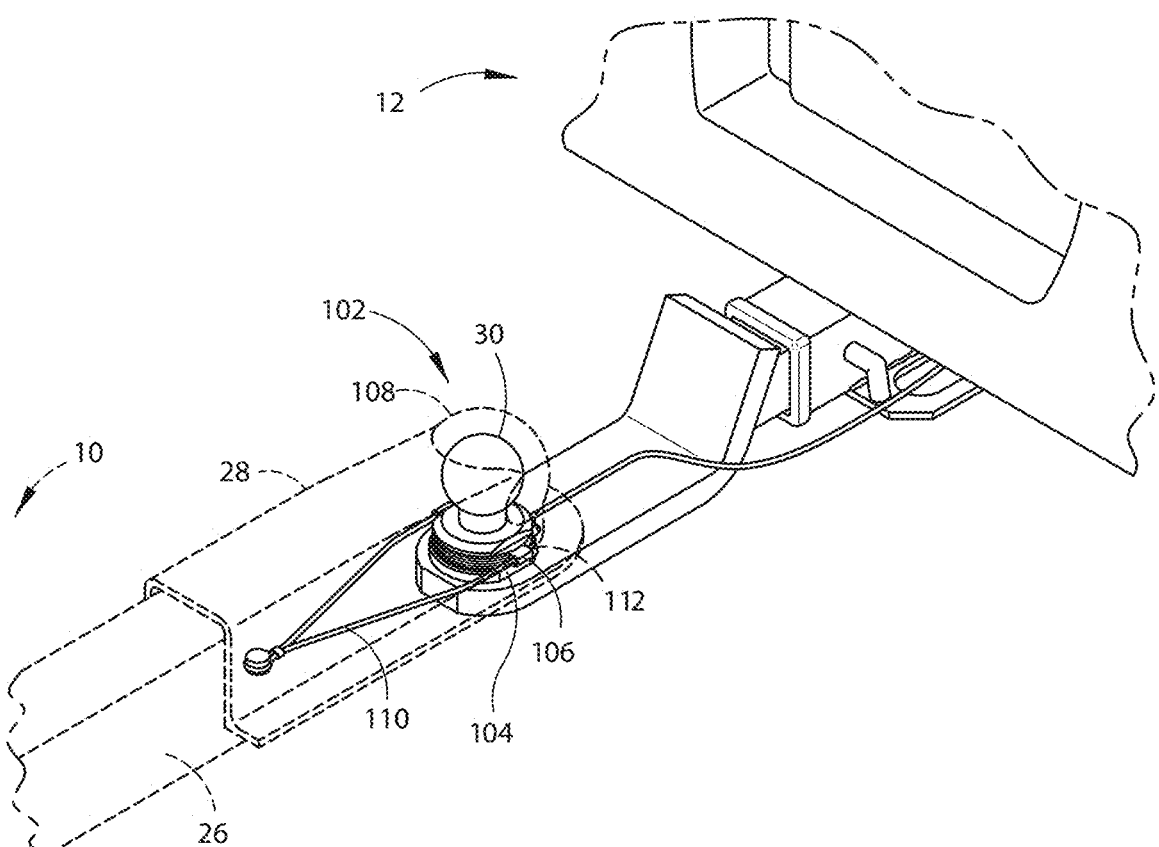
FIG. 4 is a detailed schematic diagram of a connection interface between a vehicle and a trailer demonstrating a trailer angle sensor according to one aspect of the disclosure.

Referring now to FIGS. 2 and 4, the system 8 may further comprise a trailer angle detection apparatus 102. As previously discussed, the system 8 may be configured to learn or program parameters of one or more neural networks without intervention from a human operator. Accordingly, the system 8 may be configured to measure the trailer angle γ with the trailer angle detection apparatus 102 in order to validate a determination of the hitch angle γ identified from the image data captured by the imaging device 14 and/or the steering angle data and the vehicle speed data received by the steering angle sensor 76, and the vehicle speed sensor 62, respectively. In this way, the system 8 may identify the hitch angle γ from the image data and automatically label the associated image with the hitch angle γ identified by the trailer angle detection apparatus 102. Accordingly, the system 8 may collect the video data automatically to train the neural network without requiring interaction from a human user.

In an exemplary embodiment, the trailer angle detection apparatus 102 may comprise a housing 104 fixed to the hitch ball 30 on the vehicle 12. An element 106 attached to the trailer 10 may rotate relative to the housing 104 about an axis 108 defined by the hitch ball 30. A connecting member 110 may secure the element 106 to the trailer 10 for rotating the element 106 in conjunction with angular movement of the trailer 10. A sensor 112 may be configured to detect rotational movement of the element 106 for determining the trailer angle 7. It is contemplated that the element 106 in other embodiments may be alternatively secured to the trailer 10 to rotate the element 106 relative to the sensor 112 upon angular movement of the trailer 10.

In various embodiments, the sensor 112 may be referred to as the hitch angle sensor 112 and may be implemented by utilizing a variety of sensors. For example, the hitch angle sensor 112 may be implemented as a proximity sensor, a potentiometer, Hall Effect sensor, encoder, or various other forms of sensors that may be configured to measure the rotation of the trailer 10 relative to the vehicle 12. As shown in FIG. 4, the trailer angle detection apparatus 102 is shown attached to the hitch ball 30. However, it is conceivable that the trailer 10 may include an alternative assembly to the coupler assembly 28 shown and the vehicle 12 may include an alternative hitch connector. For example, the system 8 may be implemented with a fifth wheel connection, a European-style hitch ball, or other conceivable configurations without departing from the spirit of the disclosure.

Figure 5:
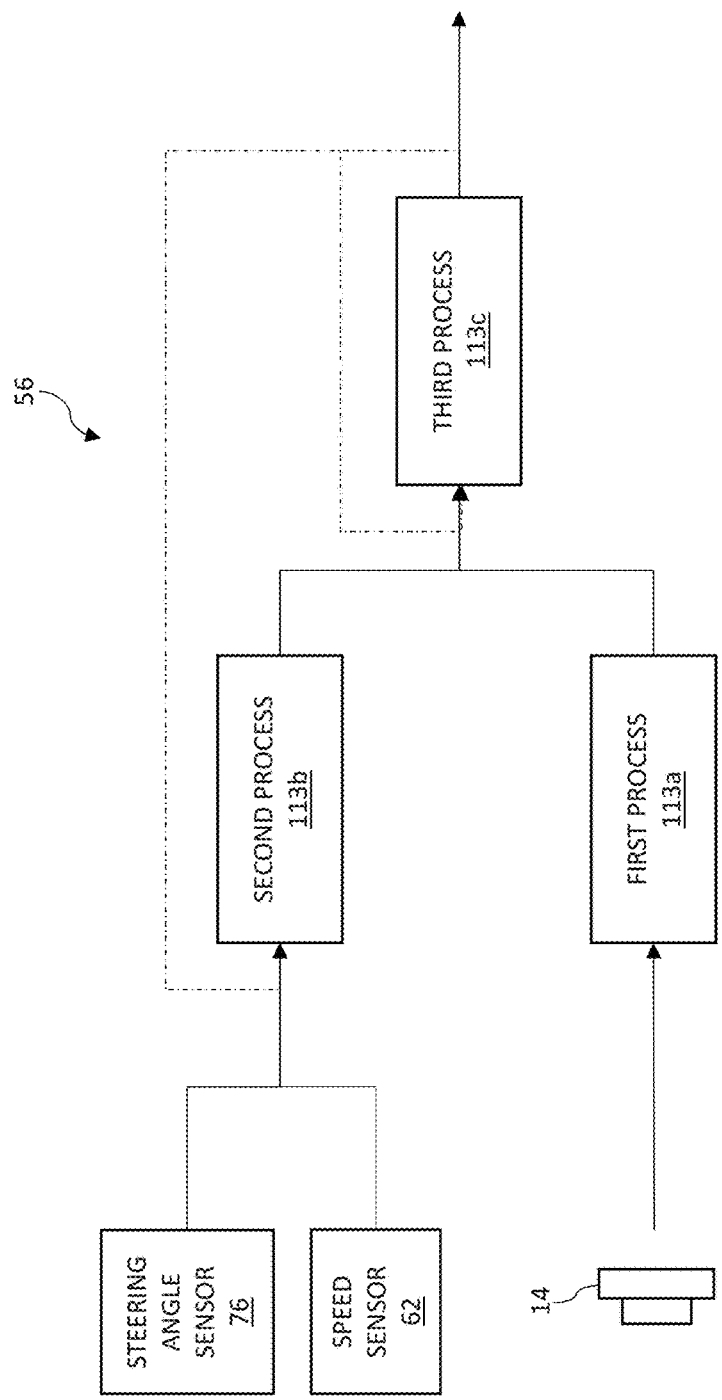
FIG. 5 is a process diagram of a trailer angle detection routine according to one aspect of the present disclosure.

Referring now to FIG. 5, an exemplary process diagram of a trailer angle detection routine 56 is shown. In general, the trailer angle detection routine involves (i) employing a first process 113*a* to identify a first estimated trailer angle γ based on the image data; (ii) simultaneously employing a second process 113b to identify a second estimated trailer angle γ based on the steering angle data and the vehicle speed data; and (iii) employing a third process 113c to produce a final, more accurate trailer angle γ estimate based on the first and second estimated trailer angles 7. Thus, three neural networks 114, 116, 118 may be utilized, with one neural network associated with each process. As illustrated, the final trailer angle γ estimate may be fed back as an input to the third process 113c and/or the second process 113b. For example, the second process 113b may incorporate the final trailer angle γ estimate to allow the second process to produce the second estimated trailer angle 7, as opposed to a range of possible trailer angles. In some embodiments, processing the steering angle data and the vehicle speed data may result in a possible range of trailer angles 7, as opposed to a trailer angle γ estimate.

Figure 6:
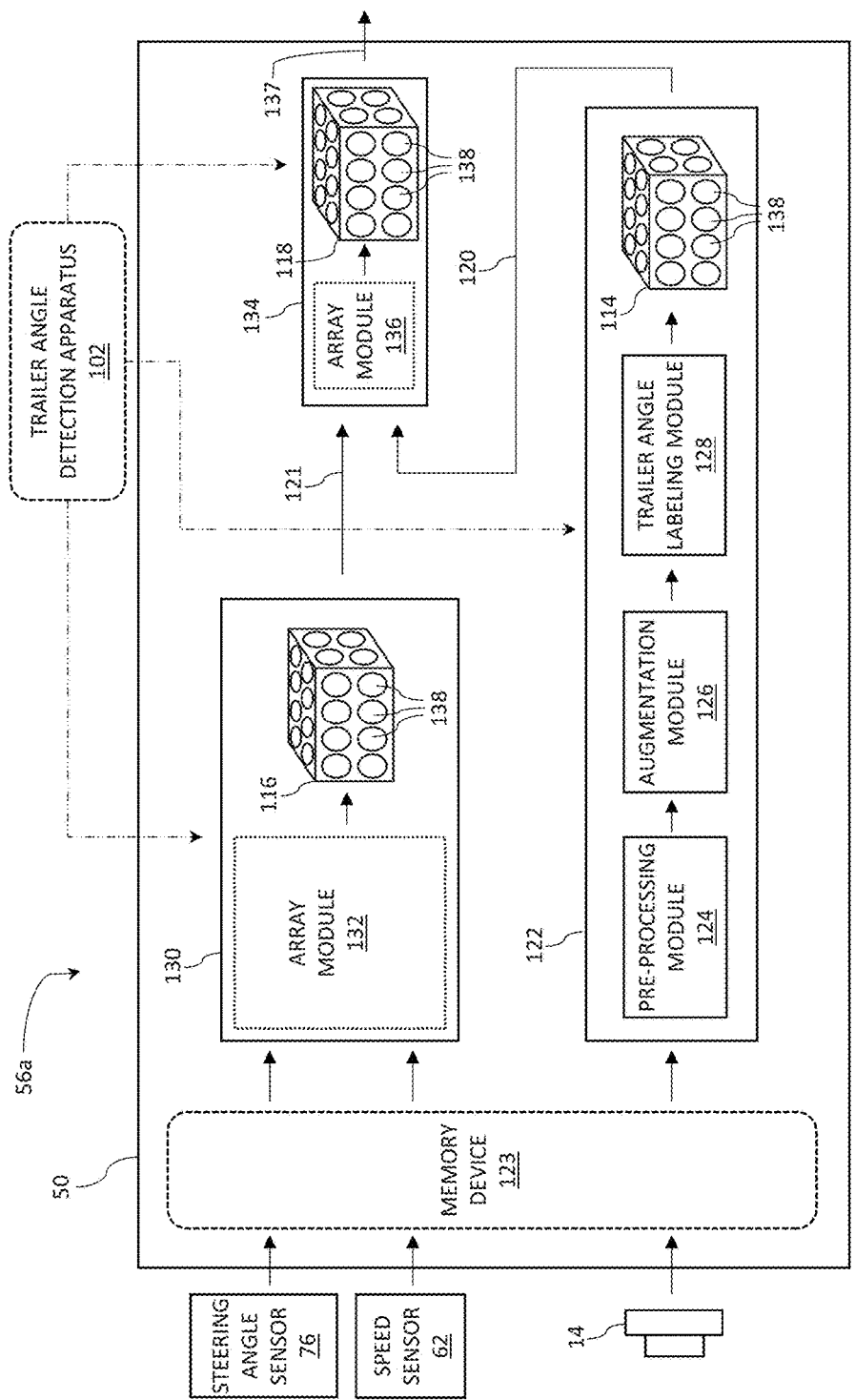
FIG. 6 is a process diagram of a training process for at least one neural network configured to estimate an angle between a vehicle and a trailer according to one aspect of the disclosure.
Figure 7:
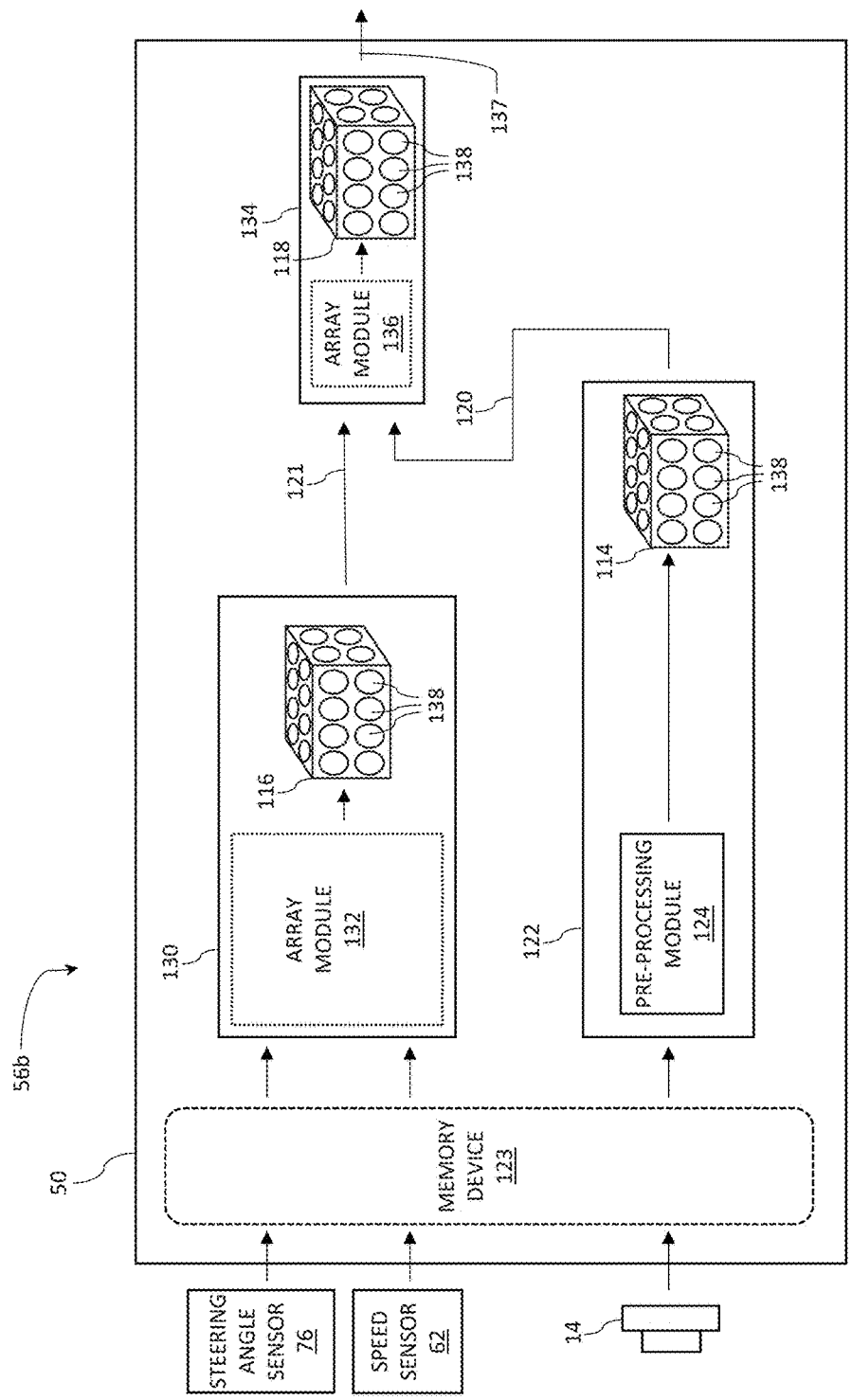
FIG. 7 is a process diagram of an operating process for at least one neural network configured to estimate an angle between a vehicle and a trailer according to one aspect of the disclosure.

With reference to FIGS. 6 and 7, a first neural network 114 is operable to process image data and or video data received from the imaging device 14. Based on the image data, the first neural network 114 may be operable to determine an estimated trailer angle 7. Concurrently with the processing of the image data, a second neural network 116 may be provided for processing the steering angle and the vehicle speed to determine an estimated change in trailer angle 7. A third neural network 118 may be downstream of the first neural network 114 and the second neural network 116 and operable to receive both the estimated trailer angle γ and the estimated change in the trailer angle 7. The third neural network 118 may generate a final estimated trailer angle γ by comparing the estimated trailer angle γ to the estimated change in trailer angle 7. In this way, the trailer angle detection routine 56 may provide an accurate and stable trailer angle γ prediction. For example, if the vehicle 12 and/or trailer 10 is at a standstill or moving very slightly (e.g., under 1.6 km/hour), the final estimated trailer angle γ may not "jump" significantly over a short period of time, despite an output of the first neural network 114 indicating that the trailer angle γ is doing so. Due to inclusion of the steering angle data and vehicle speed data, the final estimated trailer angle γ may be limited to a particular angular range. The third neural network 118 may be trained to refine the estimate of the trailer angle γ by processing a first output 120 of the first neural network 114 and a second output 121 of the second neural network 116. It is generally contemplated that employing and training the at least one network 114, 116, 118 may take place simultaneously with application of the at least one network 114, 116, 118, such that repeated application of the at least one network 114, 116, 118 may serve to improve prediction accuracy.

The trailer angle detection apparatus 102 may be utilized by the controller 50 to train one or more of the neural networks 114, 116, 118 of the hitch angle detection routine 56. The trailer angle detection apparatus 102 may only be required for initial training stages of the first neural network 114 in order to generate labels identifying the trailer angle γ for each image or at least a sample of images captured by the imaging device 14. Accordingly, once the first neural network 114 is trained such that the trailer angle γ can successfully be identified by the hitch angle detection routine 56 within an acceptable or predetermined level of error, the system 8 may be configured to utilize the first neural network 114 to detect the trailer angle γ by utilizing only the image data captured by the imaging device 14.

The trailer angle detection routine 56 will be described in reference to a training process 56a (FIG. 6) and an operating process 56b (FIG. 7). The training process 56a may utilize the trailer angle γ from the trailer angle detection apparatus 102 to train the first neural network 114 to determine a first estimate of the trailer angle γ from the image data. The training process 56a may utilize the trailer angle γ from the trailer angle detection apparatus 102 to train the second neural network 116 to accurately identify a change in the trailer angle γ from the steering angle δ and the vehicle speed v. The training process 56a may utilize the trailer angle γ from the trailer angle detection apparatus 102 to train the third neural network 118 to accurately determine a final estimate of the trailer angle data from the first output 120 of the first neural network 114 and the second output 121 of the second neural network 116. Accordingly, once trained, the operating process 56b may be configured to detect the trailer angle γ without data provided by the trailer angle detection apparatus 102. The processing requirements and steps necessary to accomplish the training process 56a may be more rigorous and/or demanding with regard to the processing capability of the controller 50. The processing steps for the training process 56a may be completed by a system comprising increased processing capacity or processing power. For example, the controller 50 utilized for the training process 56a may be configured to have more capable image processing engines, processors capable of increased processing speeds, and generally more advanced system architecture than the controller 50 utilized for the operating process 56b. In this way, the system 8 may be effectively designed to promote economical manufacturing of the system 8 for training embodiments as well as operating embodiments, which may be incorporated in consumer products (e.g., the vehicle 12).

Referring first to the training process 56a, the microprocessor 52 or, more generally, the controller 50 may first receive image data from the imaging device 14. In particular, the controller 50 may include an image processing module 122 configured to receive the image data. The image data may be supplied sequentially or stored in a memory device 123 and supplied to the image processing module 122 in bulk. The controller 50 may first process the image data via a pre-processing module 124. The pre-processing module 124 may be configured to crop each image frame received from the imaging device 14. The cropping of the image data may be consistently processed based on the positional relationship of the hitch ball 30 in the field of view 48. For example, the hitch ball 30 may be registered or identified during an initial connection or setup of the hitch ball 30 with the vehicle 12. Once identified, the controller 50 may be configured to crop the image data from the imaging device 14 based on predetermined extents or a portion of the image data designated in relation to the location of the hitch ball 30 in the field of view 48. In this way, the image data supplied to the first neural network 114 may be limited in positional variation and quality that may be apparent in raw data received from the imaging device 14.

In some embodiments, the controller 50 may further be configured to process the data via an image augmentation module 126. The image augmentation module 126 may be configured to augment the image data by a variety of techniques. For example, the cropped image data received from the image pre-processing module 124 may be augmented by the image augmentation module 126 by various techniques including, but not limited to, flipping, rotating, translating, scaling, color-enhancing, histogram stretching, noise filtering, selective noise inclusion, etc. Following processing of the image data via the image pre-processing module 124 and/or the image augmentation module 126, the controller 50 may utilize the trailer angle γ to label each frame of the image data via a trailer angle labeling module 128. Effectively, the trailer angle labeling module 128 may be implemented as data attributed to each of the frames of the image data that may be input into the first neural network 114. In this way, the training process 56a may provide for the image data from the imaging device 14 to be processed and input into the first neural network 114 with the trailer angle γ of each image frame identified to train the parameters of the first neural network 114 to accurately identify the trailer angle γ from only the image data. The first output 120 of the first neural network 114 may be compared to the trailer angle γ calculated from the trailer angle detection apparatus 102. A difference between the first output 120 and the trailer angle γ generated from the trailer angle detection apparatus 102 may be incorporated as feedback to the first neural network 114. Based on this feedback, the first neural network 114 may adjust various weights and/or other parameters of the first neural network 114 to improve the accuracy of the first output 120.

Still referring to the training process 56a, the microprocessor 52 or, more generally, the controller 50, may receive steering angle data and vehicle speed data from the steering angle sensor 76 and the speed sensor 62, respectively. In particular, the controller 50 may include a motion processing module 130 configured to receive the steering angle data and the vehicle speed data. The steering angle data and the vehicle speed data may be supplied sequentially or stored in the memory device 123 and supplied to the motion processing module 130 in bulk. The motion processing module 130 may include a first array module 132 for stacking the steering angle data and the vehicle speed data in a first array. In this way, the steering angle data and the vehicle speed data may be supplied to the second neural network 116 as a structured data set (e.g., a single data stream, as opposed to multiple data streams). The second neural network 116 may be trained in a similar fashion to the first neural network 114. For example, the second output 121 of the second neural network 116 may be compared to a change in trailer angle γ measured by the trailer angle detection apparatus 102. A difference between the estimated change (e.g., the second output) and a change in the trailer angle γ as measured by the trailer angle detection apparatus 102 may be incorporated as feedback to the second neural network 116. Based on this feedback, the second neural network 116 may adjust various weights and/or other parameters of the second neural network 116 to improve the accuracy of the second output 121.

Still referring to the training process 56a, a final prediction module 134 of the controller 50 may be configured to receive the first output 120 and the second output 121. The final prediction module 134 may include a second array module 136 for stacking the first output 120 and the second output 121 in a second array. In this way, the first output 120 and the second output 121 may be supplied to the third neural network as a structured data set (e.g., a single data stream, as opposed to multiple data streams). The third neural network 118 may also be trained via incorporation of the trailer angle γ measured by the trailer detection apparatus 102. For example, a third output 137 of the third neural network 118 may be compared to a change in trailer angle γ measured by the trailer angle detection apparatus 102. A difference between the estimated trailer angle γ (e.g., the third output 137) and the trailer angle γ as measured by the trailer angle detection apparatus 102 may be incorporated as feedback to the third neural network 118. Based on this feedback, the third neural network 118 may adjust various weights and/or other parameters of the second neural network 118 in order to improve the accuracy of the third output 137.

In general, the at least one neural network 114, 116, 118 may comprise a plurality of neurons 138, which may be arranged in a three-dimensional array comprising a width, a depth, and a height. The arrangement of the neurons 138 may provide for each layer (e.g. dimensional cross-section of the array) to be connected to a small portion of the preceding layer. In this way, the first neural network 114 may process the data through regression to reduce each image to a single vector to identify the trailer angle γ. In this way, the first neural network 114 may transform each frame of the image data layer by layer from original pixel values to the final output. In general, the specific architecture of the first neural network 114 may vary, and as may be understood by those having ordinary skill in the art, the training process 56a may begin with a pre-trained model. In this way, the training process 56a may be utilized to fine-tune the pre-trained, convolutional neural network to accurately detect the trailer angle γ from the image data captured by the imaging device 14. Examples of pre-trained models that may be implemented for the training process 56a may include, but are not limited to, the following: LeNet, AlexNet, ZF Net, GoogLeNet, VGGNet, ResNet, etc.

Once the image data is received by the first neural network 114, a deep learning procedure may be implemented to regress or estimate the trailer angle γ. For example, the first neural network 114 may be implemented as a deep convolutional network. The architecture of the first neural network 114 may be a plurality of convolutional networks followed by activation functions. To help avoid overfitting, dropout layers and other regularization techniques may be implemented. In an exemplary embodiment, fully connected layers at the end of the first neural network 114 are responsible for identifying the estimate of the trailer angle γ. Since the object of the first neural network 114 may be to perform a regression task, an activation function may not be utilized at the output.

The arrangement of the neurons 138 in the second neural network 116 and the third neural network 118 may provide for each layer (e.g. dimensional cross-section of the array) to be fully connected to the preceding layer. This arrangement of the second and third neural networks 116, 118 may provide each neuron 138 in a layer to connect to each neuron 138 of the preceding layer. In this way, the second neural network 116 may process the steering angle data and the vehicle speed data to operate as structured data, without requiring convolutional layers in the second neural network 116 to extract features.

Similar to the second neural network 116, the third neural network 118 may process data (e.g., the first output 120 and the second output 121) as structured data, without requiring convolutional layers in the third neural network 118 to extract features. This may be because the third neural network 118 may be downstream of the first neural network 114, where convolutional layers may have already been applied to extract image features, and because the second neural network 116 may output expected data types (e.g., angle data, such as trailer angle γ estimates and estimated changes in trailer angle 7). In this way, the third neural network 118 may transform the data it receives by weighting individual neurons 138 to specific weights that produce accurate estimations of the trailer angle 7. In general, the specific architecture of the second and third neural networks 116, 118 may vary and, as may be understood by those having ordinary skill in the art, the training process 56a may begin with a pre-trained model. In this way, the training process 56a may be utilized to fine-tune the pre-trained, fully-connected neural network to accurately detect the trailer angle γ from the first and second outputs 120, 121 of the first and second neural networks 116, 118, respectively. Examples of pre-trained models that may be implemented for the training process 56a may include, but are not limited to, the following: LeNet, AlexNet, ZF Net, GoogLeNet, VGGNet, ResNet, etc.

Referring now to FIG. 7, once the neural networks 114, 116, 118 are trained, the operating process 56b of the hitch angle identification routine 56 may be processed without the need of the trailer angle γ from the trailer angle detection apparatus 102. Accordingly, the operation of the operating process 56b may be limited relative to the training process 56a. For example, the controller 50 may similarly process the image data via a pre-processing module 124. The pre-processing module 124 may be configured to crop each image frame received from the imaging device 14 based on the positional relationship of the hitch ball 30 in the field of view 48. The result of the steps completed by the pre-processing module 124 may generate image data that may be more uniform than the image data received directly from the imaging device 14. Such uniformity in proportions in relation to the hitch-ball 30 and image quality (e.g. contrast, noise, etc.) may provide for the trailer angle identification routine 56 to improve the successful identification of the trailer angle γ in the image data without requiring the secondary measurements available from the trailer angle detection apparatus 102 in the training process 56a. Accordingly, the disclosure may provide for improved operation and accuracy of the system 8 based on both the image processing steps provided by the module 124 and the utilization of the first neural network 114.

The operating process 56b may generally incorporate a plurality of images taken and/or processed across several instances. By recoding sequential instances of the trailer angle 7, a previous (e.g., immediately preceding) trailer angle γ estimate may be compared to a current trailer angle γ estimate to check if a sudden jump in trailer angle γ estimation has occurred. The current trailer angle γ estimate may be incorporated into various stages of the operating process 56b to ensure that the system 8 produces accurate and continuous predictions. For example, the imager 14 may be operable to capture a first image at a first time and a second image at a second, later time, between which the steering angle δ from the steering angle sensor 76 and the vehicle speed v from the speed sensor 62 may be monitored by the power assist steering system 68 and the vehicle sensor module 60, respectively. Steering angle data corresponding to the steering angle δ and vehicle speed data corresponding to the vehicle speed v may be received by the controller 50 and processed in the second neural network 116.

The controller 50 may be operable to a calculate a difference of a first angle of the trailer relative to the vehicle, estimated at the first instance, and a second angle of the trailer relative to the vehicle, estimated at the second instance. The difference in the first angle and the second angle may be in the form of an absolute value of an angle (e.g., |10°|), or may include directional data, such as a positive sign or a negative sign reflecting which direction the trailer angle γ has shifted (e.g., −10° corresponding to a front-passenger side direction, and 10° corresponding to a driver side direction). By monitoring the steering angle data and the vehicle speed data, the controller 50 may also be operable to determine an estimated change of the trailer angle γ from the first instance to the second instance. For example, by utilizing kinematic relationships between rotational motion (including dynamics of a center of rotation, speed, acceleration, jerk, etc.), the estimated change of the first angle may be approximated, either in the form of a range or in the form of a specific value.

The difference of the first angle and the second angle, as well as the estimated change, may be compared within the final estimation module 134 prior to or after being arranged in the second array. The second array module 136 may be configured to store the difference of the first angle and the second angle, as well as the estimated change of the trailer angle γ. In this way, the second array module 136 may be operable to provide the third neural network 118 with two estimates for the change in trailer angle γ—a first estimate being based on the image data (i.e., the estimated change) and a second estimate being based on the steering angle δ and the vehicle speed v (i.e., the difference). The difference and the estimated change may be communicated from the second array module 136 to the third neural network 118. The third neural network 118 may be trained to compare the difference and the estimated change to generate the final predicted trailer angle γ. In this way, the operating process 56b may serve to predict the trailer angle γ based on the image data, the steering angle δ, and the vehicle speed v.

According to some embodiments, the third output 137 of the third neural network 118 may be fed back as an input to the third neural network 118. The third neural network 188 may be operable to utilize (e.g., compare) the third output 137 to calculate a predicted range. In this way, the third neural network 118 may be employed to limit a subsequent third output 137 to be within the particular range. In the event that the first output 120 and the second output 121 are significantly different, the third neural network 118 may be operable to bias one of the outputs 120, 121 over the other. For example, a neuron 138 of the third neural network 118 corresponding to the second output 121 may be weighted heavier (i.e., may affect the third output) than a neuron 138 corresponding to the first output 120. For example, the third neural network 118 may be trained such that the prediction of the trailer angle γ never exceeds 5° greater or lesser than an immediately preceding (e.g., −1 second, −0.5 seconds, −0.25 seconds, −0.1 seconds, etc.) prediction. This is a non-limiting example of how the third neural network 118 may include comparison operations of multiple data inputs across time. Effectively, by incorporating feedback, the operating process 56b may limit the prediction of the trailer angle γ from "spiking" (e.g., exceeding +/−5-1% of a previous estimate). In this way, a more stable prediction may be generated.

The estimated change of the first angle (e.g., a past trailer angle γ), as previously described, may be in a range having a maximum estimated angle change and a minimum estimated angle change. In some cases, the range may be employed (e.g., output from the second neural network 116) because determining a specific value may require more information than only steering angle data and vehicle speed data. For example, because the rate at which the trailer angle γ changes may depend on trailer length D, initial trailer angle, etc., a specific value of the trailer angle γ may be challenging to determine based only on steering angle data and vehicle speed data. However, employing only the steering angle δ and the vehicle speed v with the second neural network 116 may allow the second neural network to determine the minimum and maximum estimated angle changes (i.e., the range).

For example, if the initial trailer angle is 90° and the vehicle speed v is −2 kilometers per hour (−1.2 miles per hour) at a steering angle δ of 15° for 3 seconds, then the final trailer angle γ may be, for example, 75° (i.e., a change of −15°). However, if the initial trailer angle is 45° and the vehicle speed v is −2 kilometers per hour (−1.2 miles per hour) at a steering angle δ of 15θ for 3 seconds, the final trailer angle γ may be, for example, 20° (i.e., a change of −25°). In this example, the rate at which the trailer angle changes may be solely due to mathematical, kinematic principles (e.g., translation of the center of rotation of the vehicle-trailer body) and/or may also be based on physical properties of the specific trailer 10, such as trailer length D. Absent additional information and/or assumptions being processed via the second neural network, the second neural network may not output a specific value estimation of the trailer angle γ.

One example of the operating process 56b serving to prevent inaccurate trailer angle γ estimations is the case in which the first process 113a produces a trailer angle γ estimate based on an environmental condition, such as the presence of a parking line near the hitch ball 30 during a reversing process. As the vehicle 12 reverses with non-zero steering angle δ, within the field of view, an angle at which the parking line extends relative to the hitch ball may change at a different rate and/or a different direction than the rate and/or direction the trailer angle γ changes. Because the parking line may cause the first process 113a to mistakenly identify the parking line as the coupler assembly 28, the first output 121 may include a trailer angle γ estimate that is significantly different than the true trailer angle γ. Additionally, the trailer angle γ estimate may fluctuate back and forth between the parking line angle and the true trailer angle γ, since each of the parking line and the coupler assembly 28 may be identified as the connection point. Factoring in vehicle speed v and steering angle δ allows the operating process 56b to correct for this error. More specifically, the second process 113b may provide a range of possible trailer angles 7 and/or a specific trailer estimate to compare the first output 120 to via the third process 113c. In addition, previous estimates of the trailer angle γ (such as those immediately preceding the "jump" in trailer angle γ), as produced by the third process 113c, may provide an even more robust prediction algorithm.

According to some aspects of the disclosure, the image processing module 122 and or other measuring methods may be employed to determine trailer length D. Further detailed implementations of a system for determining and utilizing the trailer length D are discussed in further detail in U.S. patent application Ser. No. 14/794,336, which is incorporated herein by reference in its entirety. In general, one purpose of determining the length of the trailer 10 may be to incorporate length data corresponding to the trailer length D into the operating process 56b. The second neural network 116 may, for example, incorporate the length data in order to refine the range of the estimated change in trailer angle γ. Because the rate at which the trailer angle γ changes may depend on the length of the trailer 10, the length data may allow the second neural network to provide a more precise range of the estimated change of the trailer angle. For example, a relatively long trailer (e.g., 30 feet) may have a slower rate of trailer angle γ change relative to a rate of trailer angle γ change of a short trailer (e.g., 8 feet).

The second neural network 116 and/or a portion of the motion processing module 130 may incorporate other sensor data to refine the estimated change, such as acceleration data corresponding to an acceleration of the vehicle 12, wheel slip data corresponding to an amount of slip on the vehicle wheels 40, etc. Additionally, or alternatively, an estimation of the initial trailer angle may be provided to the second neural network 116, such that the second neural network 116 is operable to determine an estimated trailer angle γ, as opposed to a change in the trailer angle γ. By including a starting condition (i.e., an initial trailer angle), as an input to the second neural network or a portion of the motion processing module 130, the steering angle data, vehicle speed data, and the initial trailer angle may be processed to produce an estimate of the second angle (i.e., the "current" trailer angle γ). In some embodiments, the specific value (i.e., trailer angle estimate) may be determined by incorporating the previous trailer angle γ estimate via feedback of the third output 137. In this configuration, the third neural network 118 may be operable to process the second angle as determined by the first neural network 114 (i.e., the first output 120) and the second angle as determined by the second neural network 118 (i.e., the second output 121), as opposed to estimates of a change in the trailer angle γ. The resulting prediction (e.g., third output 137 of the third neural network 118) may therefore be determined by processing the image data, the steering angle data, and the vehicle speed data in various ways.

Figure 10B:
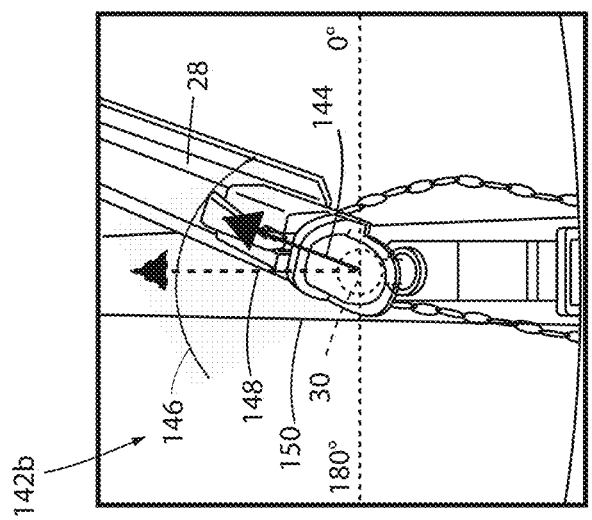
FIG. 10B is an example of a cropped image of the connection interface with output data overlaying the connection cropped image according to one aspect of the disclosure.
Figure 10A:
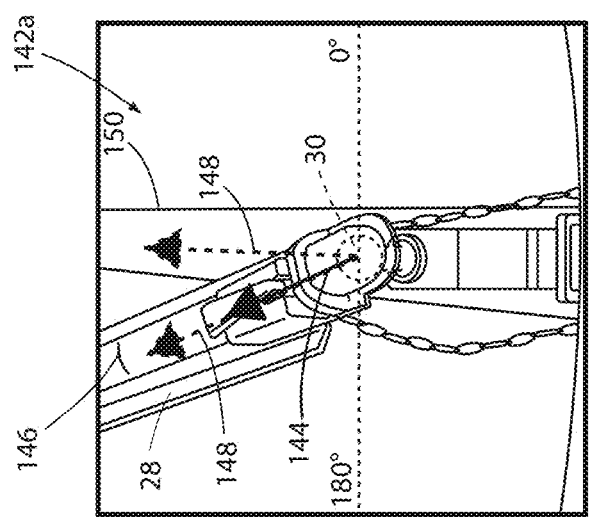
FIG. 10A is an example of a cropped image of the connection interface with output data overlaying the connection cropped image according to one aspect of the disclosure.

As previously discussed, the first neural network 114 may be configured to receive the image data from the pre-processing module 124 and/or the augmentation module 126. Upon completion of the analysis of each frame of the image data, the final estimation module 134 may output the trailer angle γ overlaying an image of the hitch ball 30, as shown in FIGS. 10A and 10B. The systems and methods described herein may provide for the training and physical implementation of the system 8 that may effectively train the at least one neural network 114, 116, 118 such that the trailer angle γ may be accurately identified in a variety of environmental conditions, lighting conditions, and for a variety of trailer topographies and orientations.

Figure 8:
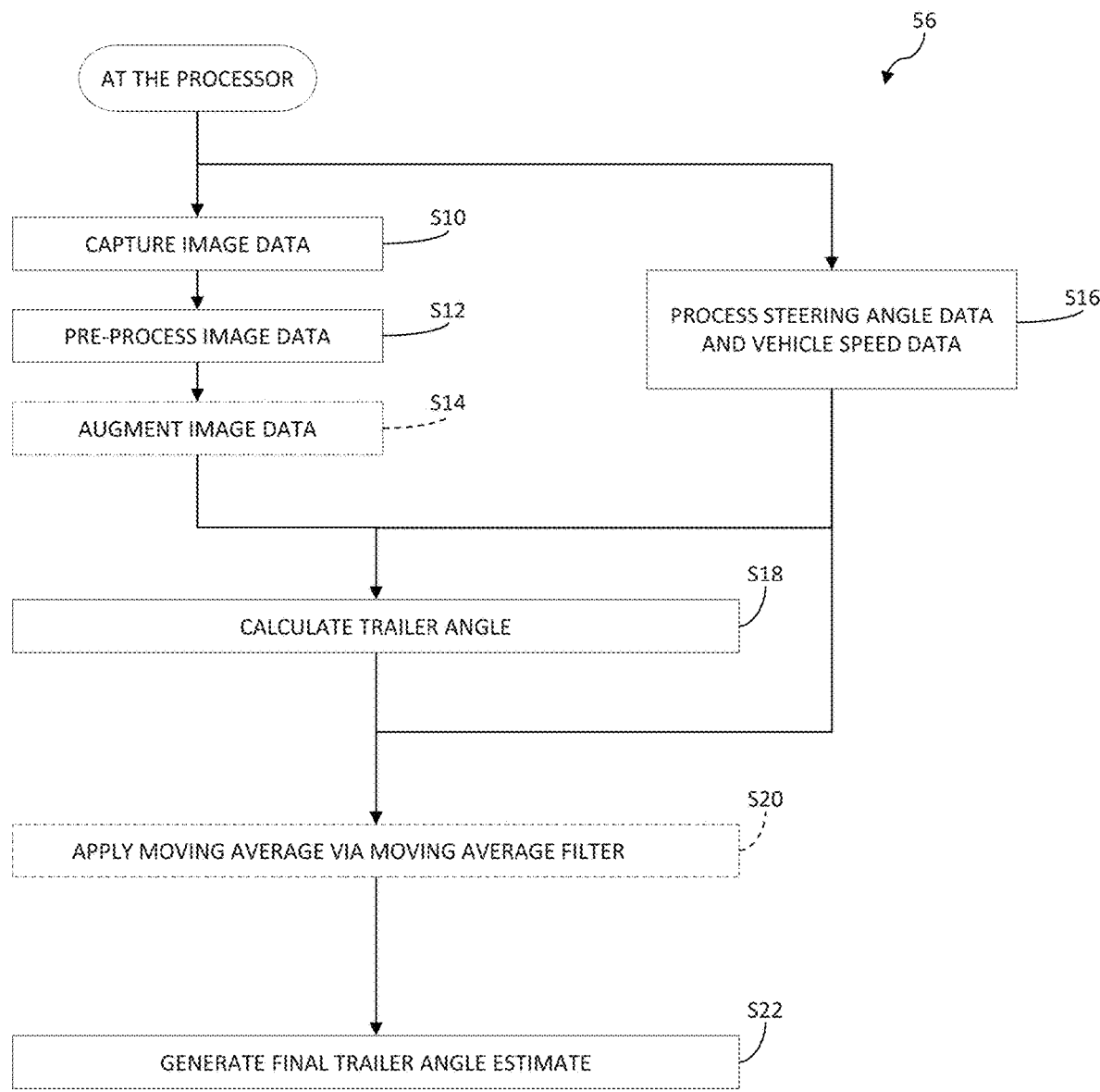
FIG. 8 is a flow chart of an operating process for at least one neural network configured to estimate an angle between a vehicle and a trailer according to one aspect of the disclosure.

Referring now to FIG. 8 a flow chart illustrating an. Because the operating process 56 may have a continuous streams of data, the process 56 illustrated may take place continuously based on new inputs received at later instances. Therefore, terms such as "before" and "after" in relation to FIG. 8 may generally be used in reference to estimates generated at particular instances. The process 56b may begin by capturing image data with the imaging device 14 demonstrating a field of view 48 that includes the coupler assembly 28 (S10). Once the image data is captured, the process 56b or method may continue by pre-processing the image data via the pre-processing module 124 (S12). The pre-processing module 124 a may be configured to crop each image frame captured by the imaging device 14. The cropping of the image data may be consistently processed based on the positional relationship of the hitch ball 30 in the field of view 48. Once identified, the controller 50 may be configured to crop the image data from the imaging device 14 based on predetermined extents or a portion of the image data designated in relation to the location of the hitch ball 30 in the field of view 48. In this way, the image data supplied to the first neural network 114 may be limited in positional variation to improve the sample data provided to train the first neural network 114.

Next, in step S14, the image augmentation module 126 may augment the image data by a variety of techniques. For example, the cropped image data received from the image pre-processing module 124 may be augmented by various techniques including, but not limited to, flipping, rotating, translating, scaling, color enhancing, histogram stretching, noise filtering, selective noise inclusion, etc. Following processing of the image data via the image pre-processing module 124 and/or the image augmentation module 126, the controller 50 may determine a first trailer angle γ estimate (S16). The augmentation step S14 may be omitted in some configurations, such that, after the pre-processing step S12 or the capturing step S10, the process may proceed to directly to step S18.

Concurrently with steps S10-S14, the motion processing module 130 may determine a second trailer angle γ estimate (S16). Steps S18-S22 may be performed in the final estimation module 134 and may take place concurrently with one another. At step S18, the trailer angle γ may be estimated based on the outputs of steps S14 and S16. Optionally, the estimated trailer angle γ may then be compared to a moving average of estimated trailer angles γ at step S20. The moving average may be determined based on a moving average filter that incorporates the second output 121, as well as the output of step S18, to determine the moving average. Additionally or alternatively, a Kalman filter may be applied at step S20. By comparing the estimate to the moving average or other trend representation value, the process 56 may prevent prediction spikes. After the optional step S20, the final trailer angle estimation may be generated based on an output of the filter at step S22.

It is generally contemplated that, in some implementations, the third output 137 may be returned to the operating process 56b to ensure that the final trailer angle γ estimate does not experience significant spikes that are not representative of the true trailer angle γ. By comparing current/previous final trailer angle γ estimations to intermediate values generated by the system 8, a more accurate trailer angle γ prediction method 56b may be achieved.

Figure 9:
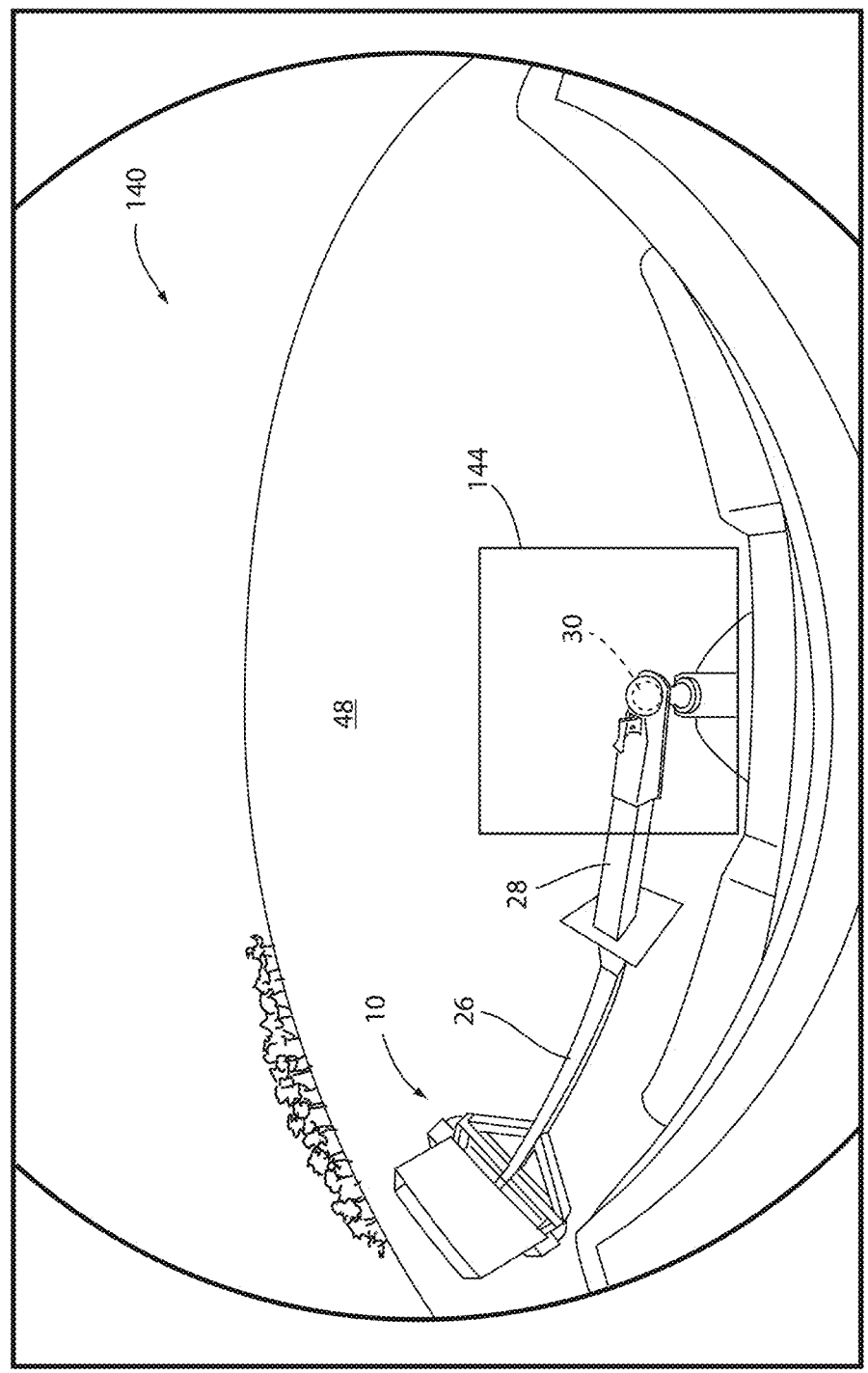
FIG. 9 is a diagram of image data captured by a reverse camera of a vehicle demonstrating a region of interest of a connection interface between a vehicle and a trailer according to one aspect of the disclosure.

Referring now to FIG. 9, an example of the image data received from the imaging device 14 by the controller 50 is shown. FIGS. 10A and 10B demonstrate the cropped image data 142a, and 142b. The cropped image data 142 represents the input provided to the first neural network 114 that has been cropped based on the cropping extents demonstrated as the boundary outline 144 shown in FIG. 9. As previously discussed, the cropped image data 142 may be generated by the pre-processing module 124 and/or the augmentation module 126 based on a fixed or identified relationship of the hitch-ball 30 within field of view 48. In this way, the image data supplied to the first neural network 114 may be limited in positional variation and quality that may be apparent in raw data received from the imaging device 14.

Figure 11B:
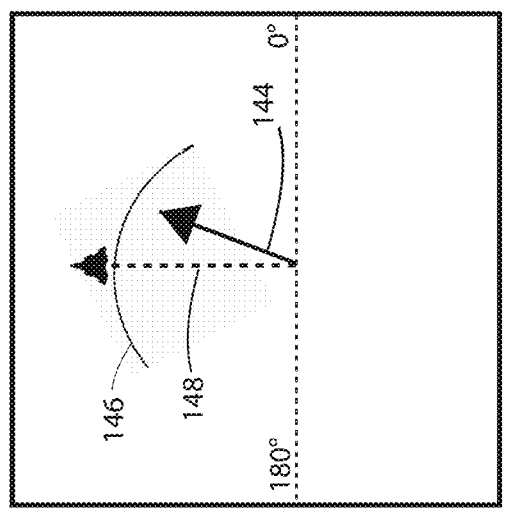
FIG. 11B is an example of the output data of FIG. 10B with image data omitted according to one aspect of the disclosure.
Figure 11A:
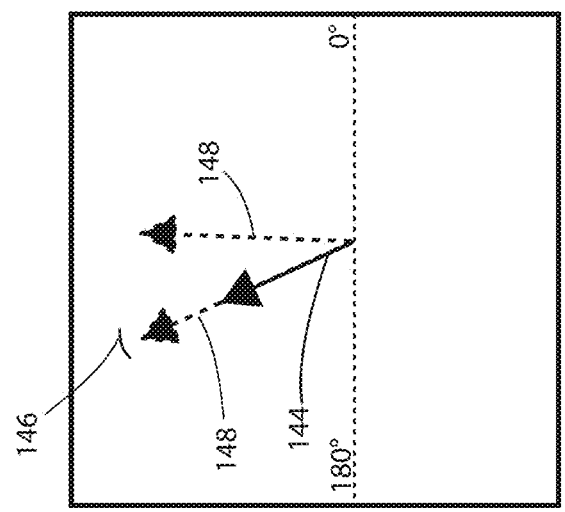
FIG. 11A is an example of the output data of FIG. 10A with image data omitted according to one aspect of the disclosure.

Referring to FIGS. 10A and 10B, the cropped image data 142 supplied to the first neural network 114 as shown. As illustrated in each of FIGS. 10A and 10B, a final estimate vector 144 corresponding to the output of the final estimation module 134 (e.g., third output 137) is shown as a solid line with an arrow-head identifying a rearward direction of the trailer 10. A range 146 depicting the estimated change in trailer angle γ, as generated by the motion processing module 130, is illustrated by an arc overlaying the cropped image data 142. In addition, a first stage vector 148 corresponding to an output of the image processing module 122 (e.g., first output 120) is shown as a dashed line with an arrow-head identifying a rearward direction of the trailer 10. For clarity, the vectors and ranges of FIGS. 10A and 10B are duplicated in FIGS. 11A and 11B in the same cropped field but with the image of the physical components removed, with FIG. 11A corresponding to FIG. 10A and with FIG. 11B corresponding to FIG. 10B. For purposes of demonstrating various aspects of operation of the controller 50, FIGS. 10A and 10B each illustrate an image of a road line 150, such as a parking line or a lane line, in the cropped image. The road lines 150 may be mistaken for the trailer hitch by the image processing module 122 and therefore cause the first stage vector 148 to overlay the road line 150. This error may be due to application of edge detection on the image when a road line 150 crosses an area of the image adjacent the hitch ball 30 and/or the coupler assembly 28. As illustrated in FIGS. 10A and 10B, one such error is presented with a parking line disposed at least partially in-line with the hitch ball 30 location.

Referring particularly to FIG. 10A, a video feed of the coupler assembly 28 is illustrated as a single image. In this example, the vehicle 12 is stationary (i.e., vehicle speed v is 0). However, due to the presence of the road line 150 near the coupler assembly 28 and extending along a potential angle of the coupler assembly 28, the image processing module 122 estimates the trailer angle γ to be approximately 90 degrees at a first time and 130 degrees at a second time. Because the vehicle 12 is stationary (and the trailer 10 is stationary), the estimated change of the trailer angle γ is 0 and the controller 50, via the final estimation module 134, determines the trailer angle γ to be approximately 130 degrees based on the estimated change (as determined by the motion processing module 130) and the estimated trailer angle γ (as determined by the image processing module 122). This determination may be performed by the controller 50 performing a variety of operations incorporating the vehicle speed v and/or the steering angle δ.

For example, the controller 50 may be operable to filter outlier data from the first stage of prediction (e.g., first output 120) by determining a mode value or a median value of the first output 120 and disregarding/cancelling values outside of the mode or median value. Additionally, or alternatively, the controller 50 may compare the first output 120 to a previous first output 120 or a previous pattern of first outputs 120 (e.g., a continuous trailer angle γ change prior to stopping the vehicle 12). The previous pattern or previous first output 120 may allow the controller 50 to choose the correct trailer angle γ estimation (130 degrees). For example, if the trailer 10 had, immediately preceding the vehicle 12 stopping, started reversing at an initial trailer angle γ of 90 degrees and ended at a final angle of 130 degrees, then the controller 50 may utilize this information to filter out the trailer angle prediction of 90 degrees. In this example, by processing only the vehicle speed data and the image data, the controller 50 may be operable to determine the final estimated trailer angle γ with improved accuracy as compared to an estimation of the trailer angle γ based only on the image data.

Referring now more particularly to FIG. 10B, a second image of the trailer hitch captured at a second instance relative to a first image of the trailer hitch captured at a first instance, preceding the second instance, is illustrated. As is illustrated in this example, the actual trailer angle γ changes, from FIG. 10A to FIG. 10B, from approximately 110 degrees to approximately 70 degrees (i.e., a change in trailer angle γ of −40 degrees). Accordingly, the final estimation module 134 may be operable to process the difference in the first angle and the second angle (as determined by the image processing module 122) and the estimated change in the trailer angle γ (as determined by the motion processing module 130). The difference may be illustrated as an arc 146 between the first angle and the second angle and may be approximately −20 degrees. The estimated change in the trailer angle γ may be determined to be within a range of at least −10 degrees to at most −80 degrees based on the steering angle δ and the vehicle speed v. This may be a "blind" range, such that the only data passed into the motion processing module 130 is steering angle data and vehicle speed data.

As previously discussed, incorporation of other data, such as trailer length D and/or initial trailer angle γ (e.g., the first angle or the previous trailer angle), may allow the motion processing module 130 to provide a narrower range. For example, by incorporating an initial trailer angle γ (i.e., incorporating the first angle into either the motion processing module 130 or the final estimation module 134), the controller 50 may calculate an estimated change in trailer angle γ to be between the range of −25 degrees and −55 degrees. This range may be narrower than the "blind" range because, as previously described, the rate at which the trailer angle γ changes depends on the trailer angle γ itself. Incorporation of trailer length data corresponding to the trailer length D may also allow the controller 50 to provide a narrower range than the "blind" range because, as previously described, a long trailer length D may result in a lower rate of change of the trailer angle γ, and a short trailer length D may result in a high rate of change of the trailer angle γ. The controller 50 may incorporate both the trailer length D and an initial image to provide a more precise estimated change in trailer angle γ for processing by the final estimation module 134. In the above example, the estimated change may therefore be calculated to be between the range of −35 and −45 degrees, or −39 and −41 degrees.

It is generally contemplated that, if there is an error or difference between the final estimated trailer angle γ and the actual trailer angle, the difference may be identified by the controller 50. Accordingly, based on the error, the system 8 may identify one or more factors related to the image data 142, the vehicle speed data, the steering angle data, and/or the trailer angle γ that may have caused the error. For example, the controller 50 may be configured to group image data based on the error in order to identify trailer angles γ or environmental conditions that lead to the error. In this way, the system may be configured to detect ranges of trailer angles and categories of lighting/environmental conditions that lead to inaccurate identification of the trailer angle. Based on the error identified in the categories and/or ranges, the system 8 may identify image data that needs to be captured to improve the training of the neural networks 114, 116, 118. Accordingly, the system 8 may be configured to utilize additional image samples and test images to improve the accuracy of the detection of the trailer angle γ to apply deep learning to complete the training process 56*a* of the neural networks 114, 116, 188.

It is to be understood that variations and modifications can be made on the aforementioned structures and methods without departing from the concepts of the present disclosure, and further it is to be understood that such concepts are intended to be covered by the following claims unless these claims by their language expressly state otherwise.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A trailer angle identification system comprising:
    an imaging device configured to capture an image of a trailer; and
    a controller configured to:
        receive steering angle data corresponding to a steering angle of a vehicle;
        receive vehicle speed data corresponding to a vehicle speed;
        process the image in a first neural network to generate an estimate of an angle of the trailer relative to the vehicle;

process the steering angle and the vehicle speed data in a second neural network to estimate a rate of change of the angle; and update the estimate of the angle based on the rate of change.

2. The trailer angle identification system of claim 1, the controller is configured to:

determine the estimated rate of the change of the angle based on a length of the trailer.

3. The trailer angle identification system of claim 2, wherein the controller is configured to assign a long trailer length with a lower rate of change of the angle and a short trailer length with a high rate of change of the angle.

4. The trailer angle identification system of claim 2, wherein the controller is configured to:

compare the angle to a previous estimation of the angle estimated by the at least one network.

5. The trailer angle identification system of claim 4, wherein the controller is configured to:

limit estimation of the angle based on the comparison of the angle to the previous estimation of the angle.

6. The trailer angle identification system of claim 4, wherein the controller is configured to:

process the previous estimation and the length of the trailer to determine the estimated rate of change.

7. The trailer angle identification system of claim 1, wherein the at least one neural network comprises:

a third neural network operable to process a first output of the first neural network and the second output of the second neural network.

8. The trailer angle identification system of claim 7, wherein the third neural network is a fully-connected neural network.

9. The trailer angle identification system of claim 7, wherein the third neural network is further trained to limit estimation of the angle.

10. A method of identifying a trailer angle comprising:

capturing an image of a trailer in a field of view;

receiving steering angle data corresponding to a steering angle of a vehicle;

receiving vehicle speed data corresponding to a vehicle speed;

processing the image in a first neural network to generate an estimate of an angle of the trailer relative to the vehicle;

processing the steering angle and the vehicle speed data in a second neural network to estimate a rate of change of the angle; and updating the estimate of the angle based on the rate of change.

11. The method of claim 10, comprising:

determining the estimated rate of the change of the angle based on a length of the trailer.

12. The method of claim 11, comprising:

assigning a long trailer length with a lower rate of change of the angle and a short trailer length with a high rate of change of the angle.

13. The method of claim 11, wherein the at least one neural network comprises:

a third neural network operable to process a first output of the first neural network and a second output of the second neural network.

14. The method of claim 13, wherein the third neural network is a fully-connected neural network.

15. The method of claim 13, further comprising:

training, via a controller, the third neural network to limit estimation of the angle by comparing the angle to the first output and the second output.

16. The method of claim 11, wherein the method further comprises:

comparing the angle to a previous estimation of the angle estimated by the at least one network.

17. The method of claim 16, further comprising:

limiting estimation of the angle based on the comparison of the angle to the previous estimation of the angle.

18. The method of claim 17, comprising:

processing the previous estimation and the length of the trailer to determine the estimated rate of change.

19. A trailer angle identification system comprising:

an imaging device configured to capture an image;

an angle sensor configured to measure a steering angle of a vehicle;

a speed sensor configured to measure a vehicle speed; and a controller configured to:

process the image in a first neural network to generate an estimate of an angle of the trailer relative to the vehicle;

process the steering angle and the vehicle speed data in a second neural network to estimate a rate of change of the angle; and update the estimate of the angle based on the rate of change and a trailer length.

20. The trailer angle identification system of claim 19, wherein the controller is configured to process a first output of the first neural network and the second output of the second neural network in a third neural network operable to output the estimate of the angle.

* * * * *